M. W. SCHLOSS.

ELASTIC FABRIC.

APPLICATION FILED JULY 1, 1921.

Reissued Sept. 13, 1921. 15,196.

Inventor

Meyer W. Schloss

By his Attorneys

Rosenbaum Stockbridge & Borst

UNITED STATES PATENT OFFICE.

MEYER W. SCHLOSS, OF NEW YORK, N. Y., ASSIGNOR TO TREO COMPANY, INC., A CORPORATION OF NEW YORK.

ELASTIC FABRIC.

15,196. Specification of Reissued Letters Patent. Reissued Sept. 13, 1921.

Original No. 1,359,112, dated November 16, 1920, Serial No. 297,558, filed May 16, 1919. Application for reissue filed July 1, 1921. Serial No. 481,934.

*To all whom it may concern:*

Be it known that I, MEYER W. SCHLOSS, a citizen of the United States, residing at the city of New York, in the borough of Manhattan and State of New York, have invented certain new and useful Improvements in Elastic Fabrics, of which the following is a full, clear, and exact description.

This invention relates to elastic textile fabrics, the object being to produce a fabric adapted to be made up into garments to be worn next to the body or over the underwear of the body, such for instance, as girdles, brassières, bandages and so forth. For such purposes it is desirable that the fabric shall not only be elastic, but that it shall be more or less open in structure, or "porous" to afford ventilation, while at the same time having sufficient strength and body to resist the strained condition under which such garments are used. Open work or "porous" fabrics are seldom, if ever, made with elastic cords incorporated therein because the cords will not be held from slipping by the texture of such fabrics, and while it is possible to insert rubber cords by hand or otherwise into the meshes or loops of certain loosely knit or lacy fabrics, such fabrics have no practical use for purposes such as above mentioned.

The present invention provides a way of associating rubber strands with threads in such a manner that the rubber will be firmly gripped by the threads to prevent it from becoming displaced in the fabric and the threads may be disposed in certain ways to produce the desired open work or "porous" pattern.

The fabric and the manner of making it will now be explained with reference to the accompanying drawing, in which:—

The fabric comprises rubber cords or strands arranged in parallel relation and spaced apart, the individual cords being covered or inclosed in individual textile coverings and the adjacent cords being connected together by independent cross threads which interlock with the threads covering the cords and which are arranged in groups with intervening spaces. The individual covering on the cords can be put on with sufficient tension to prevent the rubber from slipping with respect to the covering threads while the lateral or cross threads between the cords can be grouped or spaced as desired to afford the necessary "porosity", without affecting the grip between the rubber and its covering. In the process of making the fabric, which may be done on a warp knitting machine, the rubber strands are held in a considerably extended condition so that when finished the natural contraction of the rubber will draw the threads together and give body to the fabric.

Figure 1:
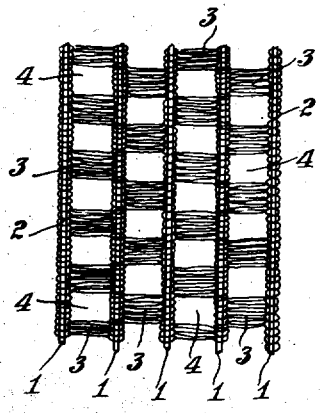
Figure 1 is a face view of a piece of the finished fabric.
Figure 3:
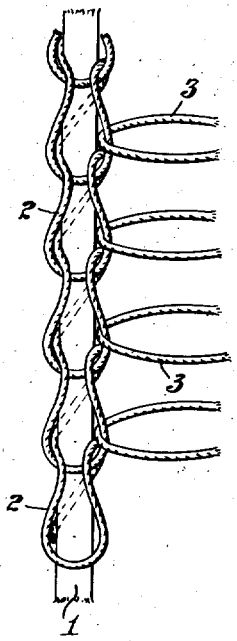
Fig. 3 is an enlarged view of one of the rubber cords covered by a chain stitch as it appears in the fabric.
Figure 2:
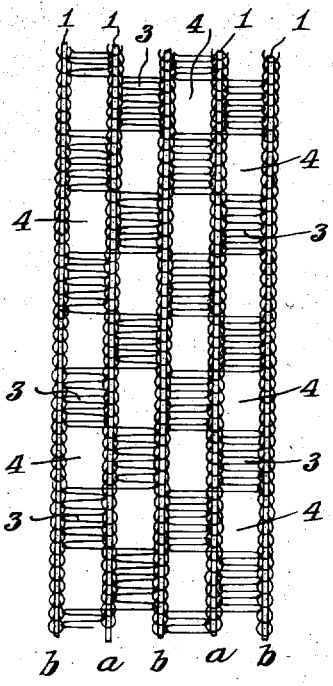
Fig. 2 is a similar view of the same piece of fabric as it appears in course of fabrication in the machine.

In Fig. 3 a short length of one of the rubber cords is shown on an enlarged scale, wherein 1 indicates the rubber strand which may be understood as naked rubber or as rubber having a winding of cotton. Such a winding, however, if provided is not to be confounded with the "covering" of the strand with which my invention deals. The latter covering is indicated by 2 and is preferably composed of a single thread wrought into a chain stitch as shown, the loops of which embrace or surround the rubber strand 1, the dotted lines indicating that part of the thread which passes around the back of the strand 1. One of the threads 2 is applied individually to each of the rubber strands and simultaneously with the formation of the loops they are interlocked with cross-threads 3 which extend back and forth between the coverings 2 of adjacent strands 1 interlocking with each. The cross-threads 3 which may be double, although shown single, are thus arranged in successive loops between the adjacent rubber strands. These loops are laid in groups with intervening spaces 4 and are staggered upon opposite sides of each cord producing a checker board open effect in the fabric. The loops in the threads 3 being arranged at right angles to the direction of the extension and contraction of the rubber strands, will readily open and close with movements of the rubber and will not oppose the stretching and contracting of the fabric. The spaces 4 between the groups of cross threads are formed by carrying the last run of thread in a group across the rubber cord to the opposite side thereof to form a group on that side and again across the same cord to the first side where another group is formed and so on throughout the fabric, thus forming spaces alternating with the groups of loops and of the same size and shape. Referring particularly to Fig. 2, the fabric may be considered as formed of alternate cords, *a*, *a*, *a*, etc., and intermediate or other cords *b*, *b*, *b*, etc., between which the cross threads are run. For example, the cross thread is run back and forth a number of times in close relation to itself between each of the alternate cords *a* and the nearest intermediate or other cord *b* at one side thereof, the cross thread then passing across that alternate cord *a* and running back and forth a number of times in close relation to itself between that alternate cord and the nearest intermediate cord *b* upon that side thereof, then across that alternate cord and run as before alternating from side to side of each alternate cord to form alternate or staggered groups of open and closed spaces. The cross threads for each alternate cord *a* are preferably so arranged with respect to those of the adjoining alternate cords as to cause all of the open spaces on opposite sides of every cord to be staggered with respect to one another. Every alternate cord *a*, *a*, *a*, etc., is thus crossed by the loop threads 3 while the other cords *b*, *b*, *b*, etc., are merely interlocked with the tips of the loops carried by the cords *a*.

This fabric can be cut at any point and in any direction as may be required in the making of articles of wear, without retraction or slipping of the rubber; it may be made of any weight desired and may be given any degree of "porosity" to suit requirements; it can be made on a machine at consequent low cost and the peculiar stitch affords a way of incorporating rubber in what is the equivalent of a knit fabric without liability of displacement of the rubber.

I claim:

1. An elastic textile open-work fabric comprising a series of parallel elastic cords spaced apart, an individual textile covering for each cord and cross threads connecting the coverings of adjoining cords, said cross threads being run back and forth in close relation forming groups with intervening open spaces.

2. An elastic textile open-work fabric comprising a series of parallel elastic cords spaced apart, an individual textile covering for each cord and cross threads connecting the coverings of adjoining cords, said cross threads being run back and forth in close relation forming groups with intervening open spaces, the groups on one side of a cord being opposite an open space on the opposite side thereof.

3. An elastic textile open-work fabric comprising a series of parallel elastic cords spaced apart, an individual textile covering for each cord and cross threads connecting the coverings of adjoining cords, said cross threads being run back and forth in close relation forming groups with intervening open spaces, the threads composing the groups on the opposite sides of alternate cords being continuous.

4. An elastic fabric comprising a series of parallel elastic cords spaced apart, a chain stitch covering for each cord, and cross threads running back and forth in close relation between each alternate cord and the next adjacent cords, the cross threads interlocking with the chain stitch covering and being repeatedly run back and forth a number of times in each space between an alternate cord and one of the adjacent cords and then passing to the opposite side of this alternate cord and being repeatedly run a number of times between said alternate cord and the other next adjacent cord, alternately, so as to provide staggered open spaces between the cords, the arrangement of cross threads for each alternate cord being such as to cause all of the open spaces on opposite sides of every cord to be staggered with respect to one another.

5. An elastic fabric comprising a series of parallel elastic cords spaced apart, and connected by cross threads running back and forth in close relation between each alternate cord and the next adjacent cords, the cross threads being repeatedly run back and forth a number of times in each space at one side of an alternate cord, then across that alternate cord and run back and forth a number of times in the space upon that side of that alternate cord, alternating from side to side to provide staggered open spaces between the cords, the cross thread for each alternate cord being disposed to form its groups of open spaces in staggered relation to those of the next adjacent alternate cords.

In witness whereof I subscribe my signature.

MEYER W. SCHLOSS.